United States Patent
Chang

(10) Patent No.: US 6,427,797 B1
(45) Date of Patent: Aug. 6, 2002

(54) TRANSMISSION STRUCTURE OF GEARBOX OF ELECTRICALLY ACTUATED CAR

(76) Inventor: Hui-Lung Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/780,309

(22) Filed: Feb. 7, 2001

(51) Int. Cl.⁷ .............................................. B60K 17/16
(52) U.S. Cl. ........................ 180/247; 180/233; 180/248; 180/250; 180/65.7; 475/298
(58) Field of Search ..................... 192/105 CD, 99 R, 192/99 A, 99 B, 99 S, 26, 65, 66.1; 475/198, 200, 206, 228, 7, 298; 180/233, 247, 245, 246, 248, 249, 250, 292, 293, 65.1, 65.6, 65.7, 343, 347, 364, 368, 369, 371, 374, 375, 378, 383, 384, 336

(56) References Cited

U.S. PATENT DOCUMENTS

| | | | | |
|---|---|---|---|---|
| 4,721,010 A | * | 1/1988 | Sheldon et al. | 74/650 |
| 4,813,297 A | * | 3/1989 | Azuma et al. | 74/675 |
| 4,819,512 A | * | 4/1989 | Azuma et al. | 74/713 |
| 5,071,395 A | * | 12/1991 | Fahy et al. | 475/226 |
| 5,103,690 A | * | 4/1992 | Macpherson et al. | 74/665 GB |
| 5,289,890 A | * | 3/1994 | Toyoda et al. | 180/65.8 |
| 5,562,566 A | * | 10/1996 | Yang | 477/3 |
| 5,704,866 A | * | 1/1998 | Pritchard et al. | 475/206 |
| 5,897,601 A | * | 4/1999 | Suzuki | 701/78 |
| 5,997,428 A | * | 12/1999 | Kagata et al. | 475/198 |
| 6,005,358 A | * | 12/1999 | Radev | 318/139 |
| 6,041,877 A | * | 3/2000 | Yamada et al. | 180/65.2 |
| 6,231,422 B1 | * | 5/2001 | Choi | 446/444 |

* cited by examiner

Primary Examiner—Avraham Lerner
Assistant Examiner—Daniel Yeagley

(57) ABSTRACT

A transmission structure of a gearbox of an electrically actuated car includes two front wheels, two rear wheels, and two gearboxes, wherein one gearbox is mounted between the two front wheels, and the other gearbox is mounted between the rear wheels. The transmission structure also includes a motor mounted between the two gearboxes. The motor has a power shaft having two distal ends each connected to a differential gear of each of the two gearboxes by means of a coupler, so as to form a four-wheel transmission mechanism.

1 Claim, 11 Drawing Sheets

TRANSMISSION STRUCTURE OF GEARBOX OF ELECTRICALLY ACTUATED CAR

BACKGROUND OF THE INVENTION

1. Field of the Invention

The present invention relates to a transmission structure of a gearbox of an electrically actuated car.

2. Description of the Related Prior Art

A conventional transmission structure of a gearbox of an electrically actuated car in accordance with the prior art is shown in FIGS. 1 and 2, wherein FIG. 1 is a schematic view of a conventional transmission structure of two rear wheels of an electrically actuated car in accordance with the prior art, and FIG. 2 is a schematic view of a conventional transmission structure of four wheels of an electrically actuated car in accordance with the prior art.

The conventional electrically actuated car 10 includes two front wheels 11 with a differential mechanism 13 together with a motor 14 mounted therebetween, and two rear wheels 12 also with a differential mechanism 13 together with a motor 14 mounted therebetween.

However, the conventional transmission structure of a gearbox of an electrically actuated car has the following disadvantages.

1. It needs to provide two motors on the differential mechanisms, thereby increasing cost of fabrication of the two motors, and thereby causing inconvenience in installation of the two motors.
2. The motor is mounted on one side of the differential mechanism, thereby causing instability of the gravity center of the wheels of the car. In addition, the two motors occupy too much space, thereby greatly limiting the design of space and efficiency of usage of the electrically actuated car.

SUMMARY OF THE INVENTION

The present invention has arisen to mitigate and/or obviate the disadvantage of the conventional transmission structure of a gearbox of an electrically actuated car.

In accordance with the present invention, there is provided a transmission structure of a gearbox of an electrically actuated car comprising: two front wheels, two rear wheels, and two gearboxes, one gearbox mounted between the two front wheels, and the other gearbox mounted between the rear wheels. The transmission structure comprises a motor mounted on the mediate portion of the chassis of the electrically actuated car and located between the two gearboxes. The motor includes a power shaft having two distal ends each connected to a differential gear of each of the two gearboxes by means of a coupler, so as to transmit the power to the four wheels synchronously, thereby forming a four-wheel transmission mechanism.

In such a manner, only one motor is provided, thereby decreasing cost of fabrication of the motor, and thereby greatly facilitating installation and maintenance of the motor. In addition, the motor is mounted on the mediate portion of the chassis of the electrically actuated car, thereby facilitating the design of space and efficiency of usage of the electrically actuated car.

Further benefits and advantages of the present invention will become apparent after a careful reading of the detailed description with appropriate reference to the accompanying drawings.

DETAILED DESCRIPTION OF THE INVENTION

Figure 1:
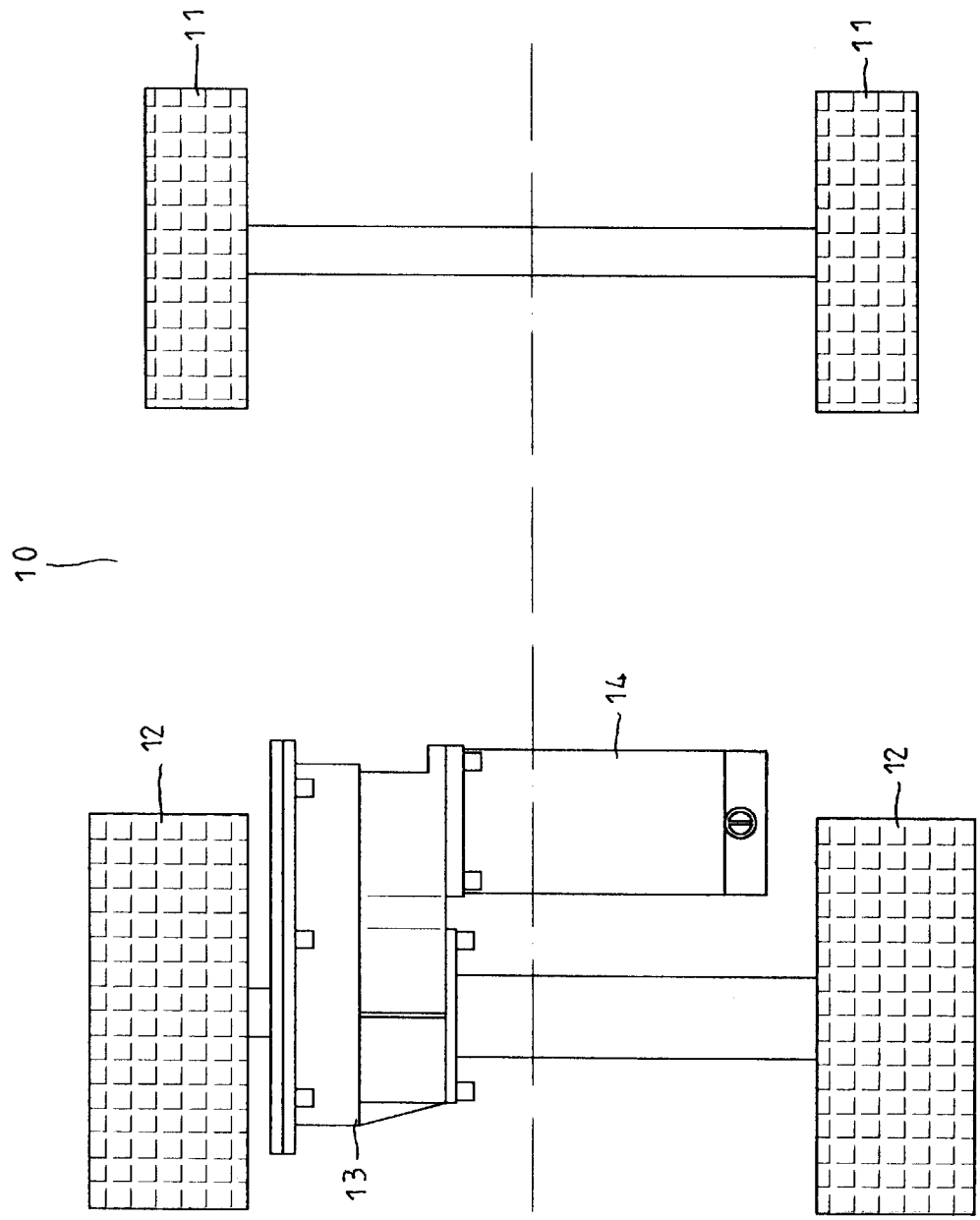
FIG. 1 is a schematic view of a conventional transmission structure of two rear wheels of an electrically actuated car in accordance with the prior art.
Figure 2:
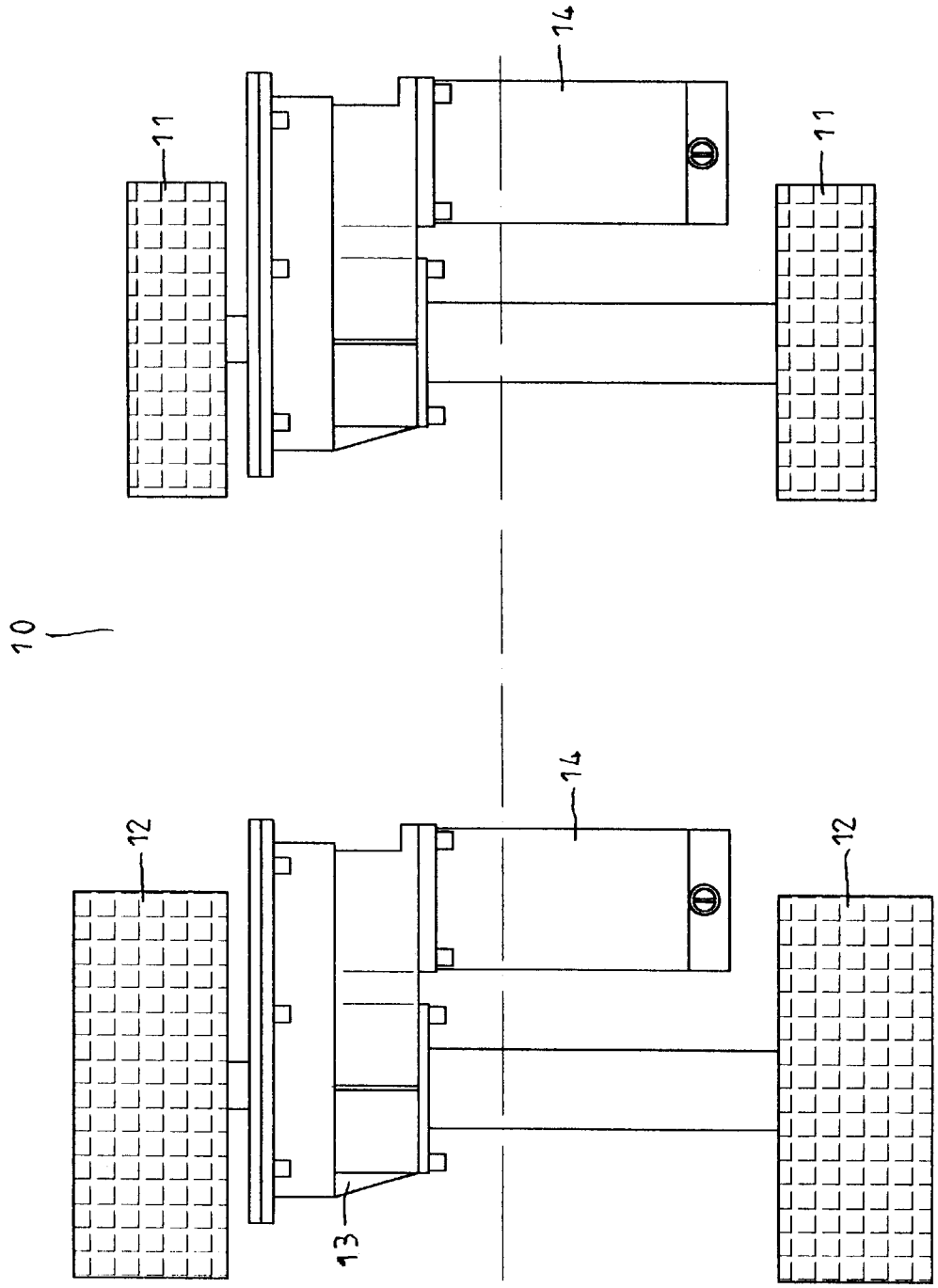
FIG. 2 is a schematic view of a conventional transmission structure of four wheels of an electrically actuated car in accordance with the prior art.
Figure 3:
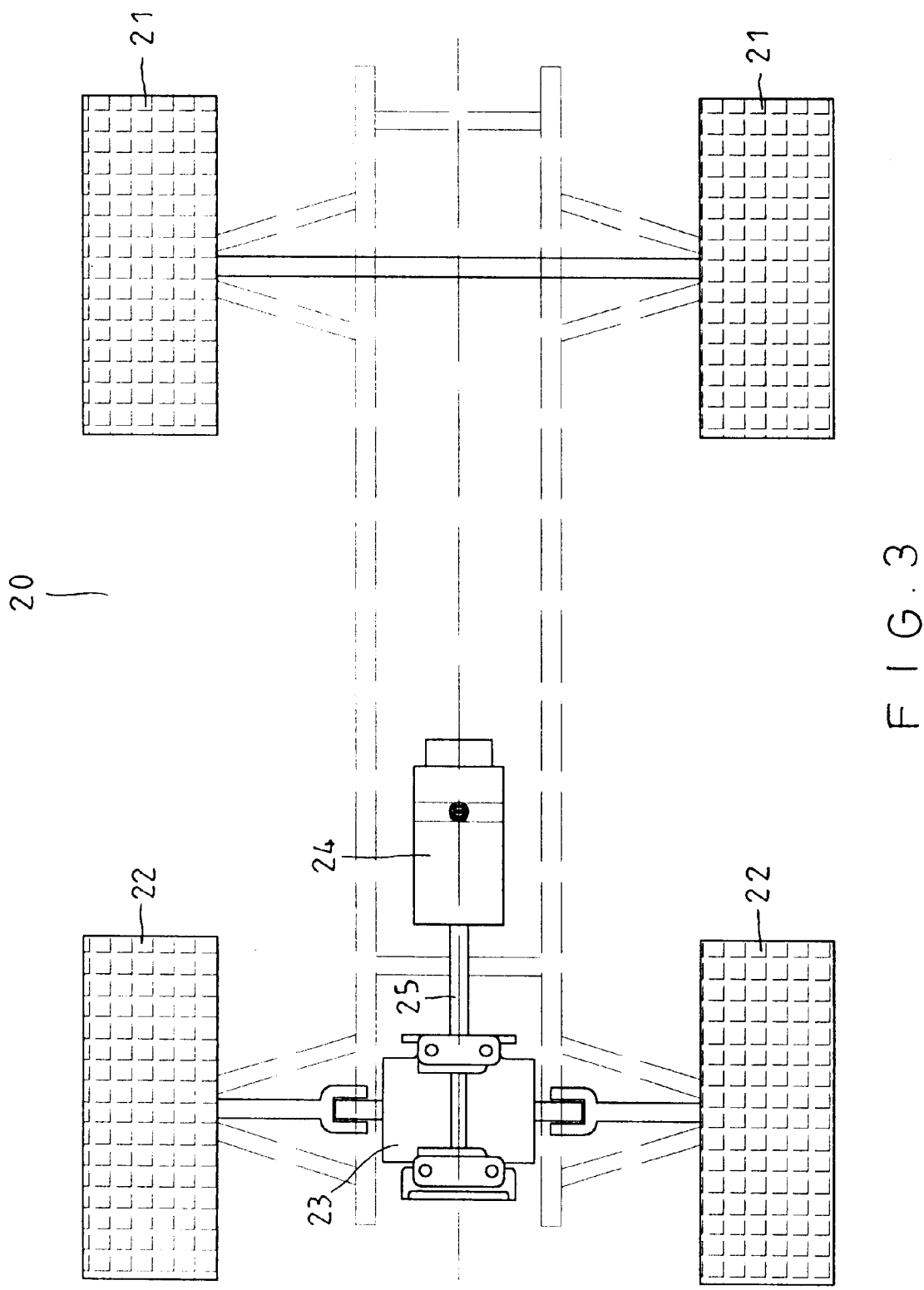
FIG. 3 is a schematic view of a transmission structure of two rear wheels of an electrically actuated car in accordance with the present invention.
Figure 4:
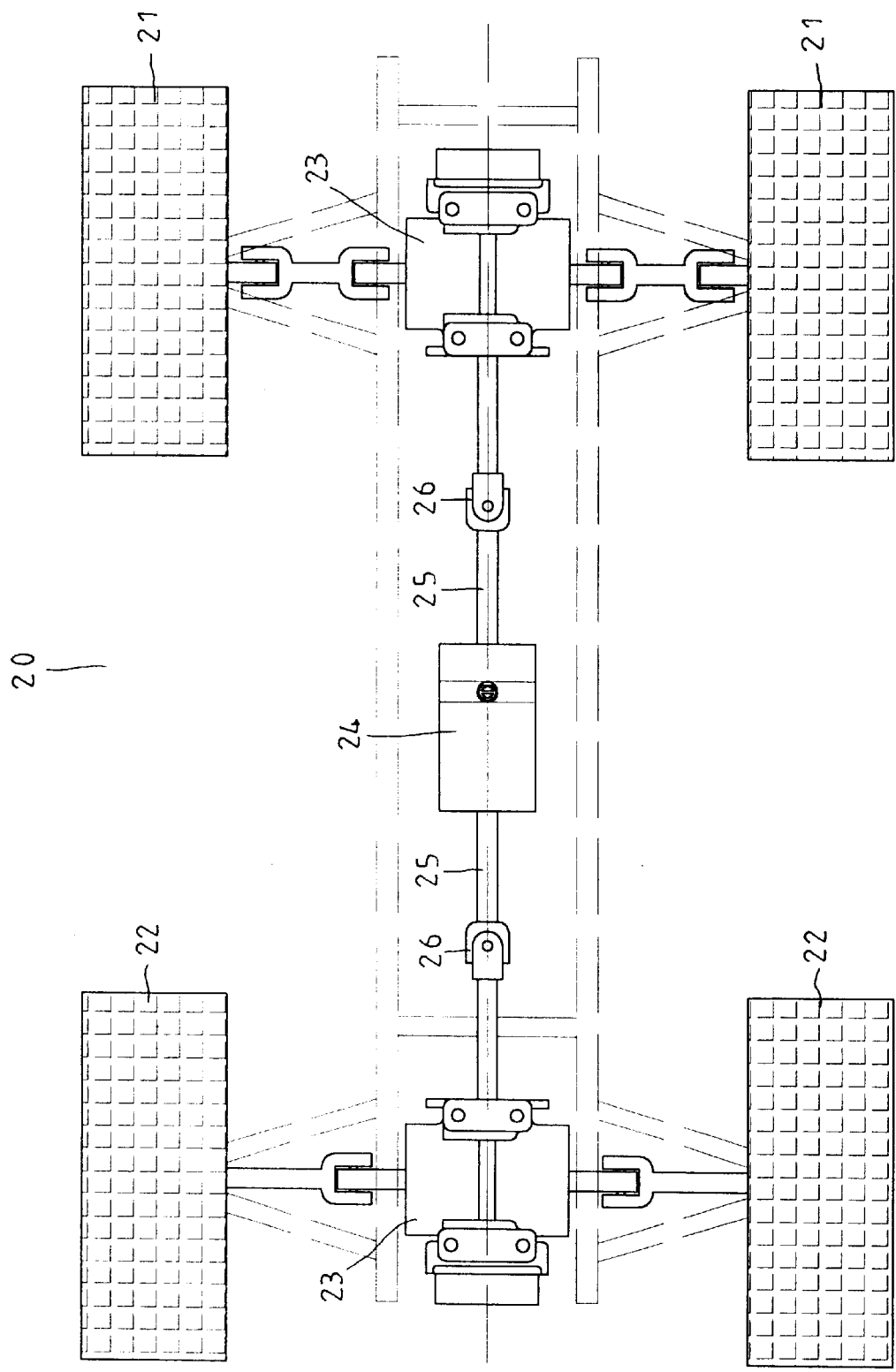
FIG. 4 is a schematic view of a transmission structure of four wheels of an electrically actuated car in accordance with the present invention.

Referring to the drawings and initially to FIGS. 3–6, a transmission structure of a gearbox of an electrically actuated car 20 in accordance with a first embodiment of the present invention comprises two front wheels 21, two rear wheels 22, and two gearboxes 23, wherein one gearbox 23 is mounted between the two front wheels 21, and the other gearbox 23 is mounted between the rear wheels 22.

The transmission structure of the electrically actuated car 20 further comprises a motor 24 mounted on the mediate portion of the chassis of the electrically actuated car 20 and located between the two gearboxes 23. The motor 24 has a power shaft 25 having two distal ends each connected to the differential gear 27 of each of the two gearboxes 23 by a coupler 26, thereby forming a four-wheel transmission mechanism.

Figure 5:
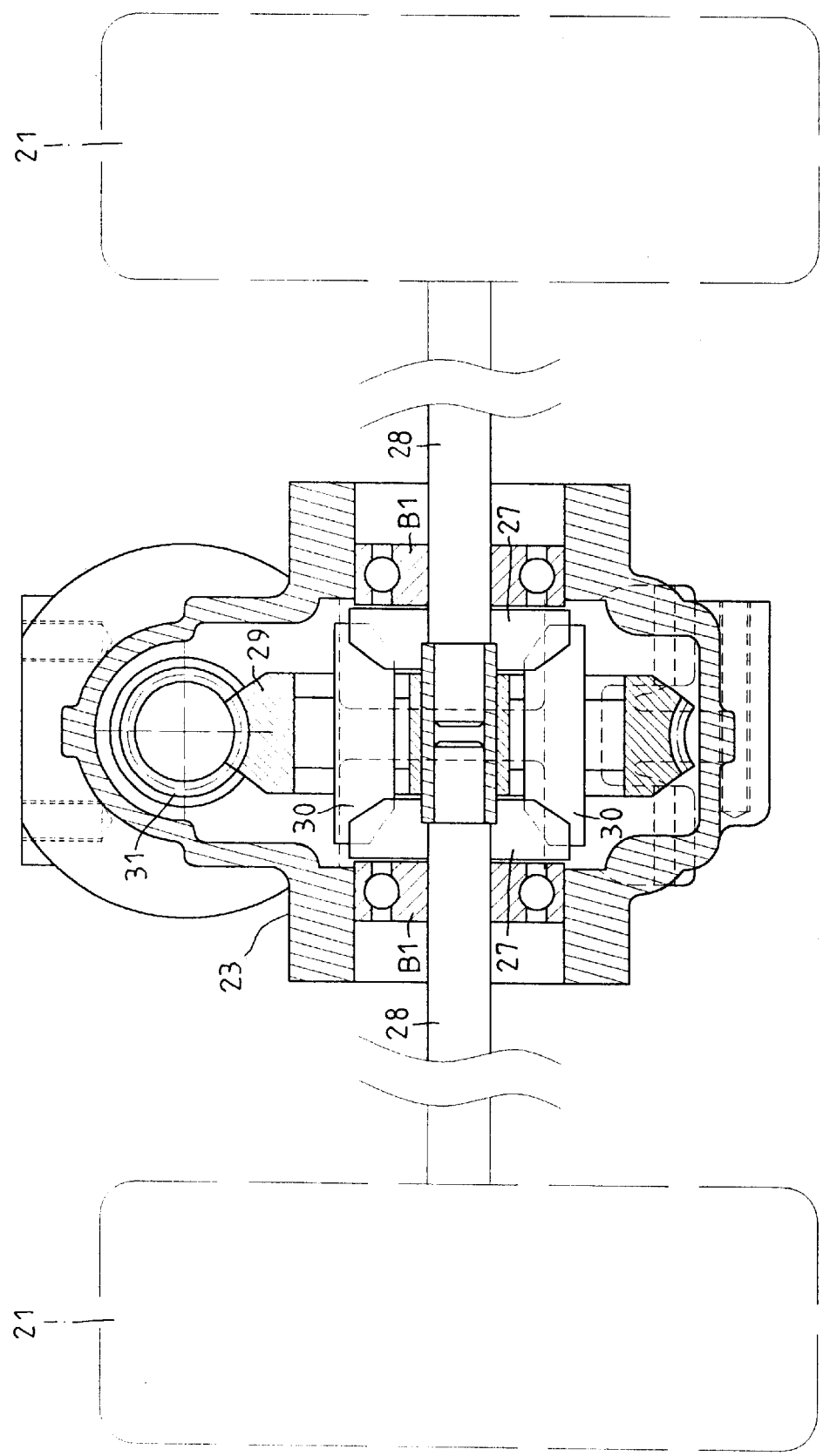
FIG. 5 is a cross-sectional view of a transmission structure of a manually operated gearbox of an electrically actuated car in accordance with a first embodiment of the present invention.
Figure 6:
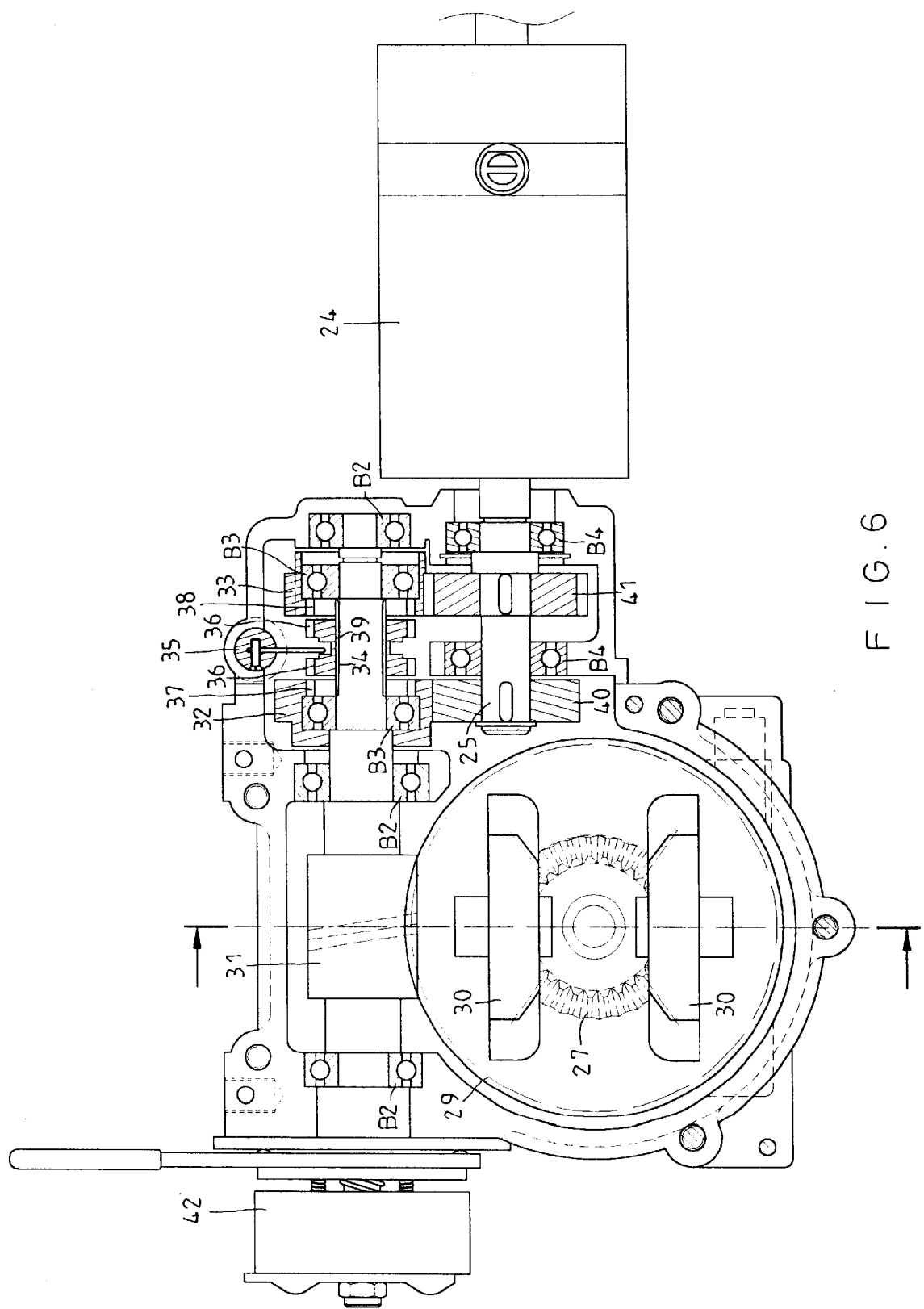
FIG. 6 is a cross-sectional view of a transmission structure of the manually operated gearbox of an electrically actuated car in accordance with a first embodiment of the present invention.
Figure 7:
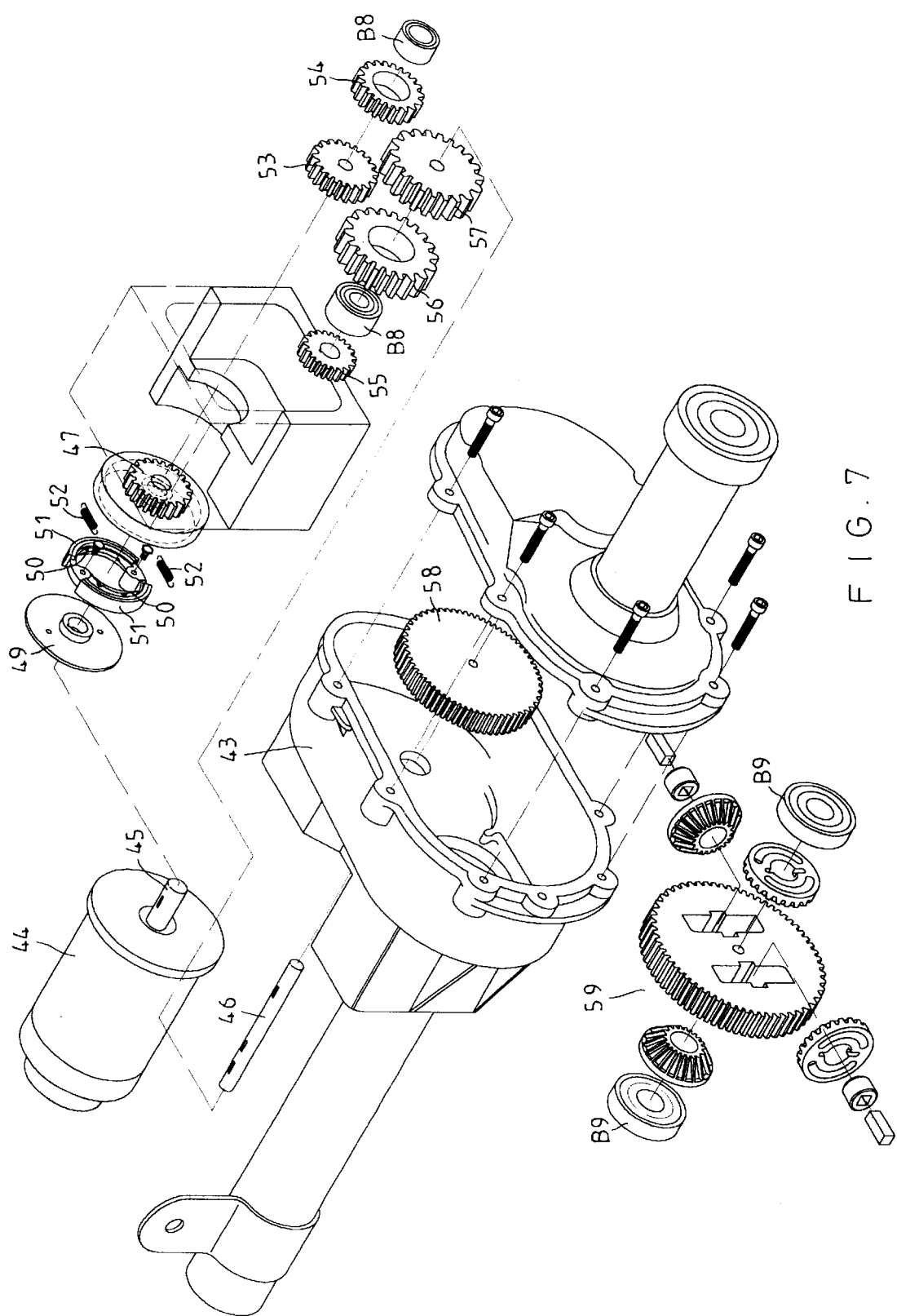
FIG. 7 is an exploded perspective view of a transmission structure of an automatically operated gearbox of an electrically actuated car in accordance with a second embodiment of the present invention.

Referring to FIGS. 5 and 6, a manually operated gearbox 23 of the present invention is shown. The gearbox 23 has the function of manually gear shifting. The gearbox 23 includes two differential gears (or bevel gears) 27 each respectively mounted on the wheel shaft 28 of the front wheel 21 and the rear wheel 22 by means of bearings B1. A worm wheel 29 is mounted in the gearbox 23 and is provided with two differential gears 30 respectively meshing with the differential gears 27. The worm wheel 29 is driven to rotate by a worm 31 which is mounted in the gearbox 23 by bearings B2.

The worm 31 has one end pivotally provided by means of bearings B3 with a first gear 32 having a first inner ratchet tooth 37, and a second gear 33 having a second inner ratchet tooth 38, wherein the first gear 32 has a number of teeth greater than that of the second gear 33. The other end of the worm 31 is provided with a brake device 42.

The one end of the worm 31 is provided with an outer ratchet tooth 34. A clutch gear 36 is slidably mounted on the one end of the worm 31 and is provided with a third inner ratchet tooth 39 meshing with the outer ratchet tooth 34 of the worm 31.

The clutch gear 36 is driven by a handle 35 to move on the one end of the worm 31 to a first position where the clutch gear 36 meshes with the first inner ratchet tooth 37 of the first gear 32 having a relatively greater number of teeth, so that the worm 31 is rotated at a relatively lower rotational speed, and a second position. where the clutch gear 36 meshes with the second inner ratchet tooth 38 of the second gear 33 having a relatively smaller number of teeth, so that the worm 31 is rotated at a relatively higher rotational speed.

A first transmission gear 40 is secured by a bearing B4 on the power shaft 25 of the motor 24 to rotate therewith and meshes with the first gear 32 for rotating the first gear 32. A second transmission gear 41 is secured by a bearing B4 on the power shaft 25 of the motor 24 to rotate therewith and meshes with the second gear 33 for rotating the second gear 33.

Referring to FIGS. 7–10, an automatically operated gearbox 43 of a transmission structure of a gearbox of an electrically actuated car of a second embodiment of the present invention is shown.

The gearbox 43 has an outer periphery provided with a motor 44. The motor 44 has a power shaft 45 and a power output shaft 46 each extended into the gearbox 43 and pivotally mounted in the gearbox 43 by bearings B5 and B6.

A high-speed gear disk 47 is pivotally mounted on the power shaft 45 of the motor 44 by a bearing B7, and a clutch 48 is secured on the power shaft 45 of the motor 44. The clutch 48 includes a fixing base 49 secured on the power shaft 45 of the motor 44 to rotate therewith, two symmetrical arc-shaped connecting pieces 50 each pivotally mounted on the fixing base 49 and each having an outer periphery provided with a friction face 51, and two tensile springs 52 each mounted between the two connecting pieces 50. Preferably, the friction face 51 of each of the two connecting pieces 50 is provided with a ratchet tooth, thereby facilitating the two connecting pieces 50 of the clutch combining with the high-speed gear disk 47.

Figure 8:
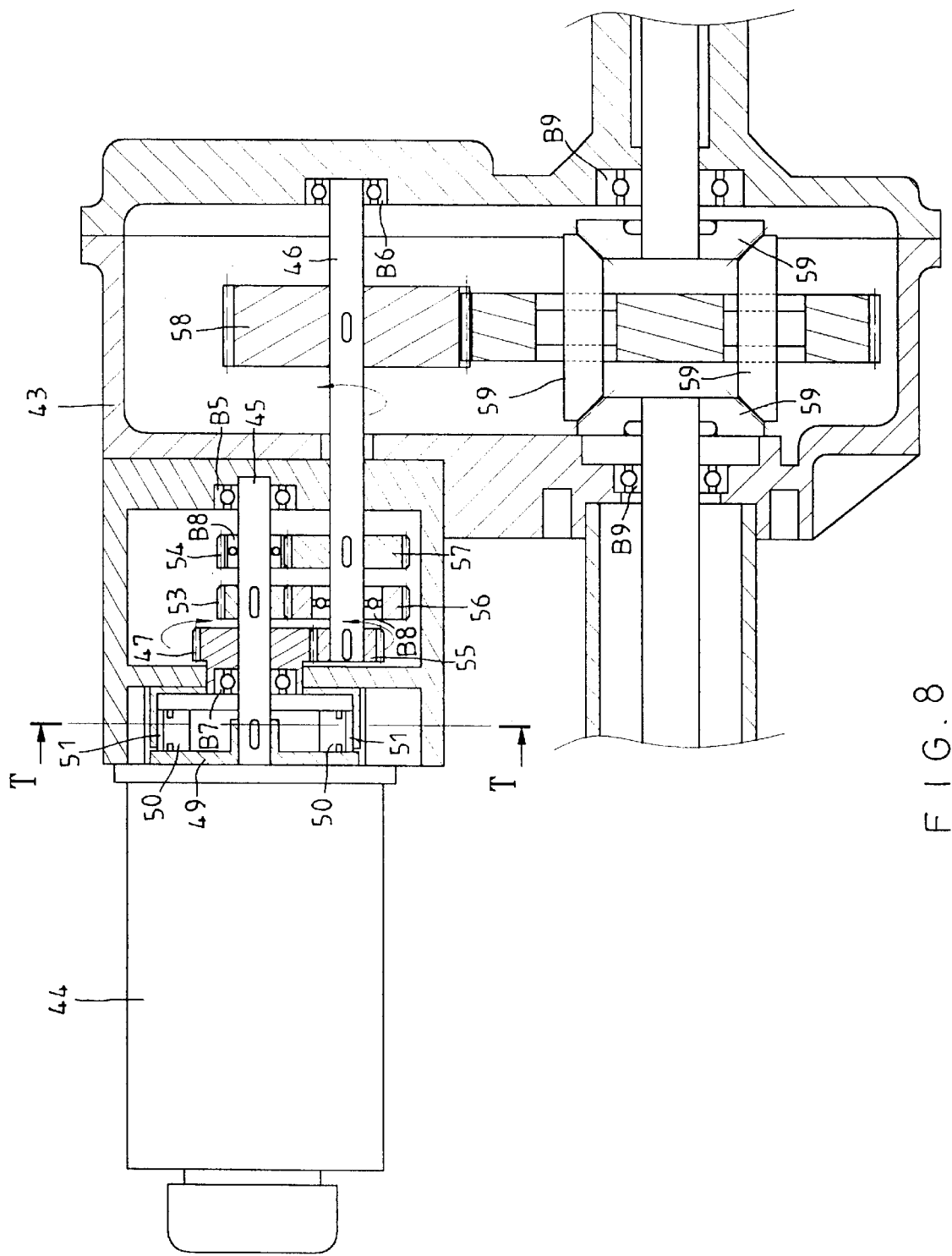
FIG. 8 is a top plan cross-sectional assembly view of the transmission structure of an automatically operated gearbox of an electrically actuated car as shown in FIG. 7.
Figure 8A:
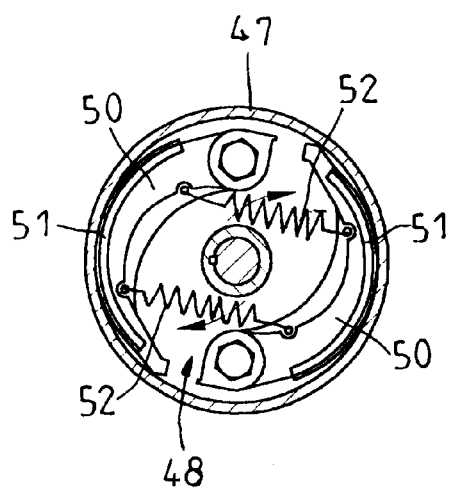

Referring to FIGS. 8 and 8A, during rotation at a relatively higher speed of the power shaft 45 of the motor 44, the two connecting pieces 50 are radially moved outward due to a centrifugal force, so that the friction face 51 of each of the two connecting pieces 50 is engaged with an inner face of the high-speed gear disk 47, thereby combining the two connecting pieces 50 with the high-speed gear disk 47 integrally, so that the high-speed gear disk 47 can be rotated with the two connecting pieces 50 of the clutch 48 synchronously. In such a manner, the high-speed gear disk 47 is rotated in concert with the clutch 48 at a high speed synchronously.

Figure 9A:
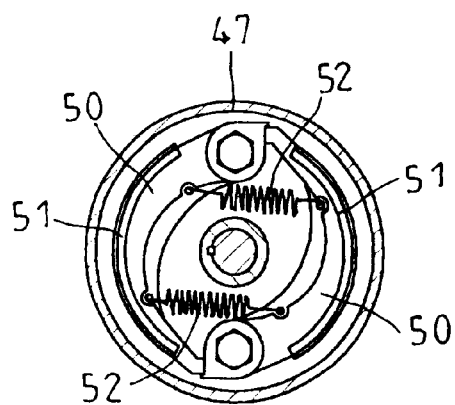
FIG. 9 is a top plan cross-sectional assembly view of the transmission structure of an automatically operated gearbox of an electrically actuated car as shown in FIG. 7.
Figure 9:
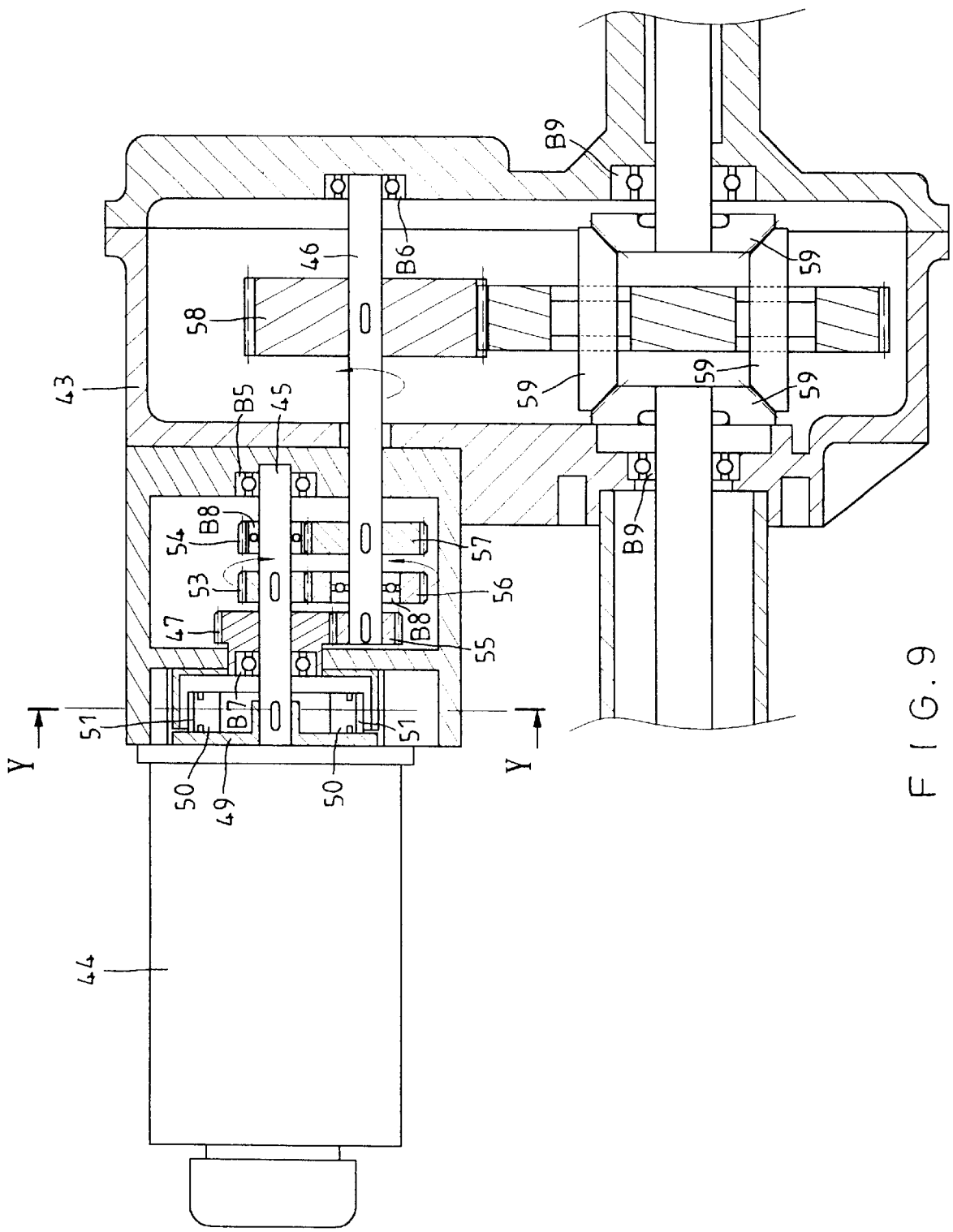

Referring to FIGS. 9 and 9A, when the electrically actuated car bears a heavy load or is moving on an inclined road, the power shaft 45 of the motor 44 is rotated at a relatively lower speed, whereby the two connecting pieces 50 of the clutch 48 are radially moved inward by the tensile springs 52, so that the high-speed gear disk 47 idles.

Again referring to FIGS. 7–10, a forward low-speed gear 53 is secured on the power shaft 45 of the motor 44 to rotate therewith. A backward low-speed gear 54 is pivotally mounted on the power shaft 45 of the motor 44 by an one-way bearing B8.

A high-speed small gear 55 is secured on the power output shaft 46 of the motor 44 and meshes with the high-speed gear disk 47. A forward low-speed large gear 56 is pivotally mounted on the power output shaft 46 of the motor 44 by an one-way bearing B8 and meshes with the forward low-speed gear 53. A backward low-speed large gear 57 is secured on the power output shaft 46 of the motor 44 and meshes with the backward low-speed gear 54.

A transmission gear 58 is secured on the power output shaft 46 of the motor 44, and meshes with differential gears 59 mounted in the gearbox 43 by bearings B9 to drive the differential gears 59.

Referring to FIG. 8, when the power shaft 45 of the motor 44 is rotated at a relatively higher speed, the high-speed gear disk 47 is rotated in concert with the clutch 48 at a high speed synchronously, to rotate the high-speed small gear 55 which rotates the power output shaft 46 of the motor 44 which rotates the transmission gear 58 which rotates the differential gears 59 so as to rotate the wheel shafts of the wheels of the electrically actuated car, thereby moving the electrically actuated car forward at a higher speed.

Referring to FIG. 9, when the power shaft 45 of the motor 44 is rotated at a relatively lower speed, the high-speed gear disk 47 idles, while the forward low-speed gear 53 is rotated by the power shaft 45 of the motor 44 to rotate the forward low-speed large gear 56 which rotates the power output shaft 46 of the motor 44 which rotates the transmission gear 58 which rotates the differential gears 59 so as to rotate the wheel shafts of the wheels of the electrically actuated car, thereby moving the electrically actuated car forward at a lower speed. At the same time, the backward low-speed gear 54 idles due to the one-way bearing B8.

Accordingly, the travel speed of the electrically actuated car may be shifted automatically by the higher or lower rotational speed of the motor 44, without having to shift the gear manually.

Figure 10:
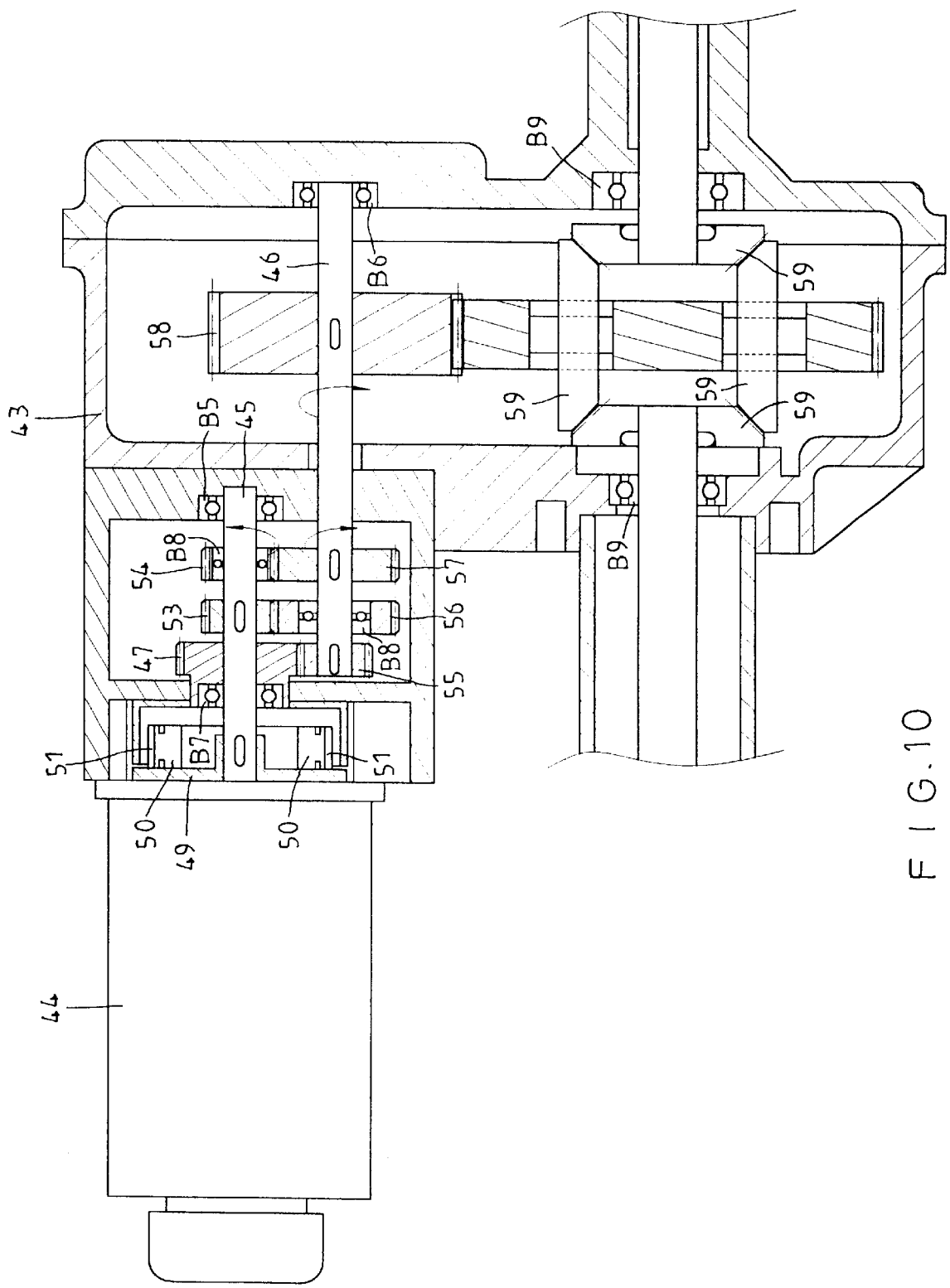
FIG. 10 is a top plan cross-sectional assembly view of the transmission structure of an automatically operated gearbox of an electrically actuated car as shown in FIG. 7.

Referring to FIG. 10, when the power shaft 45 of the motor 44 is rotated at a relatively lower speed along a reverse direction, the high-speed gear disk 47 idles, while the backward low-speed gear 54 is rotated by the power shaft 45 of the motor 44 to rotate the backward low-speed large gear 57 which rotates the power output shaft 46 of the motor 44 which rotates the transmission gear 58 which rotates the differential gears 59 so as to rotate the wheel shafts of the wheels of the electrically actuated car, thereby moving the electrically actuated car backward at a lower speed. At the same time, the forward low-speed large gear 56 idles due to the one-way bearing B8.

Although the invention has been explained in relation to its preferred embodiment as mentioned above, it is to be understood that many other possible modifications and variations can be made without departing from the scope of the present invention. It is, therefore, contemplated that the appended claims will cover such modifications and variations that fall within the true scope of the invention.

What is claimed is:

1. A transmission structure of a gearbox of an electrically actuated car comprising:
   two front wheels (21), two rear wheels (22), and two-gearboxes (23), one gearbox (23) mounted between said two front wheels (21), and the other gearbox (23) mounted between said rear wheels (22); wherein,
   said transmission structure further comprises a motor (24) mounted between said two gearboxes (23), said motor (24) has a power shaft (25) having two distal ends each connected to a differential gear (27) of each of said two gearboxes (23) by means of a coupler (26), so as to form a four-wheel transmission mechanism; and said gearbox (23) includes a worm (31) having one end pivotally provided with a first gear (32) having a first inner ratchet tooth (37), and a second gear (33) having a second inner ratchet tooth (38), said first gear (32) has a number of teeth greater than that of said second gear (33), said one end of said worm (31) is provided with an outer ratchet tooth (34), a clutch gear (36) is slidably mounted on said one end of said worm (31) and is provided with a third inner ratchet tooth (39) meshing with said outer ratchet tooth (34) of said worm (31), said clutch gear (36) is driven by a handle (35) to move on said one end of said worm (31) to a first position where said clutch gear (36) meshes with said first inner ratchet tooth (37) of said first gear (32) having a relatively greater number of teeth, so that said worm (31) is rotated at a relatively lower rotational speed, and a second position where said clutch gear (36) meshes with said second inner ratchet tooth (38) of said second gear (33) having a relatively smaller number of teeth, so that said worm (31) is rotated at a relatively higher rotational speed, a first transmission gear (40) is secured on said power shaft (25) of said motor (24) to rotate therewith and meshes with said first gear (32) for rotating said first gear (32), a second transmission gear (41) is secured on said power shaft (25) of said motor (24) to rotate therewith and meshes with said second gear (33) for rotating said second gear (33).

* * * * *